(12) United States Patent  (10) Patent No.: US 7,869,643 B2
Litichever et al.  (45) Date of Patent: Jan. 11, 2011

(54) ADVANCED CELL-TO-CELL INSPECTION

(75) Inventors: Zeev Litichever, Rehovot (IL); Erez Sali, Savion (IL); Oren Cohen, Holon (IL)

(73) Assignee: Applied Materials South East Asia Pte. Ltd., Singapore (SG)

( * ) Notice: Subject to any disclaimer, the term of this patent is extended or adjusted under 35 U.S.C. 154(b) by 1016 days.

(21) Appl. No.: 11/700,408

(22) Filed: Jan. 31, 2007

(65) Prior Publication Data

US 2008/0181484 A1  Jul. 31, 2008

(51) Int. Cl.
*G06K 9/00* (2006.01)
*G06K 9/68* (2006.01)

(52) U.S. Cl. ........................ 382/145; 382/218
(58) Field of Classification Search ......... 382/141–149, 382/218; 348/86, 92, 125; 438/16
See application file for complete search history.

(56) References Cited

U.S. PATENT DOCUMENTS

| | | | |
|---|---|---|---|
| 4,969,198 A | 11/1990 | Batchelder et al. | |
| 5,173,719 A | 12/1992 | Taniguchi et al. | |
| 6,288,780 B1 | 9/2001 | Fairley et al. | |
| 6,539,106 B1 * | 3/2003 | Gallarda et al. | 382/149 |
| 6,693,664 B2 | 2/2004 | Neumann et al. | |
| 6,973,208 B2 * | 12/2005 | Kuwabara | 382/145 |
| 2004/0146295 A1 | 7/2004 | Furman et al. | |
| 2004/0170313 A1 | 9/2004 | Nakano et al. | |
| 2006/0169900 A1 | 8/2006 | Noji et al. | |
| 2006/0193507 A1 | 8/2006 | Sali et al. | |

* cited by examiner

*Primary Examiner*—Daniel G Mariam
(74) *Attorney, Agent, or Firm*—SNR Denton US LLP

(57) ABSTRACT

Inspection of objects such as semiconductor wafers may proceed on a cell-to-cell or die-to-die basis. An image of a wafer may be obtained and the cells or dies shown therein can be inspected using any combination of appropriate die-to-die or cell-to-cell inspection methods. For example, one or more areas may be designated for cell-to-cell inspection. For each cell type, a reference image can be generated by obtaining an image of the area and displacing the image by an amount equal to the repetition vector for that cell type in opposite directions. The displaced images and the original image can be combined into a single reference image. The original image can then be compared to the reference image. In some embodiments, the displaced images are also compared to the reference image to statistically determine the presence or absence of defects.

19 Claims, 6 Drawing Sheets

ADVANCED CELL-TO-CELL INSPECTION

BACKGROUND

In the semiconductor industry, devices are fabricated by a number of processes to produce precisely-defined structures of an ever-decreasing size. Even the slightest structural defect can ruin a semiconductor device, and so to avoid losses of time and effort, detection of defects is critical before a defective device is mass-produced or further processes are performed on a defective wafer. Various inspection tools may be utilized, including those in which a view of a wafer (or other device or object) is compared to one or more reference views showing how the wafer should appear in a defect-free state. A reference image or images may be used for the comparison. For example, a reference image may depict or may be based at least in part on other portion(s) of the same wafer that (ideally speaking) contain the same structural features.

In some presently-existing inspection systems, wafers are inspected using die-to-die comparison or cell-to-cell comparison. For instance, an example of a component that may be included in a wafer is shown in FIG. 6. For instance, the component shown in FIG. 6 may comprise one of many dies in a wafer. The component may include areas that are best inspected using die-to-die inspection, such as the periphery area which may comprise, for example, logic components. Such areas may be checked for defects by comparison to one or more reference dies.

However, in other situations, cell-to-cell inspection may be desired. For example, the device shown in FIG. 6 includes a plurality of (ideally) identical memory cells of one or more types in the interior. For such cells, cell-to-cell inspection may be preferable since adjacent or nearby cells within the same die may be more similar than cells between adjacent dies. The similarities may be due to process conditions and/or the inspection tool itself. For instance, differences due to illumination, focus, or other optical irregularities may be less pronounced within a die as compared to between dies.

In some presently-existing inspection systems, cell-to-cell inspection is carried out using imaging and delay components. A first cell is imaged and then enters the delay component. A second cell is imaged and then compared to the image of the first cell in the delay component. A third cell is then imaged and compared to the second cell in the delay component, and so on. See, for example, U.S. Pat. No. 6,288,780. One disadvantage of such systems is that the delay component must be adjusted to account for different cell pitches (i.e. repetition sizes) in cases of multiple cell types. Furthermore, inspection of multiple cell pitches requires either duplicate inspection hardware or multiple inspection runs. Finally, the cells must be inspected in order—i.e. this means that, in some presently-existing systems, the wafer must be scanned in the same direction in which the cells repeat.

SUMMARY

Objects and advantages of the present invention will be apparent upon careful review of the disclosure and/or practice of one or more embodiments of the teachings herein, and include providing methods and systems for inspecting objects, such as semiconductor wafers using die-to-die and/or cell-to-cell inspection having any repetition size(s) and direction(s).

An electro-optical inspection method can include imaging at least a portion of a semiconductor wafer. Of course, the use of the term "semiconductor wafer" is meant for purposes of example only, and in other embodiments other objects can be imaged and inspected. The wafer or other object includes at least two regions, including a first region comprising a plurality of memory cells of a first type and a second region comprising a plurality of memory cells of a second type.

Differences in the structural features of each type of cells can result in a different repetition vector for each region, and the method can include accessing data that defines the repetition vector for each type. The repetition vector may be provided to the system prior to or during the inspection process, and may be derived automatically in some embodiments. In other embodiments, the repetition vector(s) may be assessed manually and input by an operator. In any event, the method can further include inspecting each region using a cell-to-cell comparison method based on the repetition vector for each region.

The memory cells of each type may differ in any combination of repetition size and/or repetition direction. For instance, in some embodiments, one of the types of memory cells differ in repetition direction in that one type repeats in the direction of the inspection while another type repeats in a direction perpendicular to the direction of inspection. The inspection method can include generating at least one reference image for each type of memory cell.

In some embodiments, inspecting can include generating a single image comprising the two or more regions of different memory cell types. Furthermore, each of the at least two regions can be inspected by a single processor in sequence.

Embodiments of the method may include those in which a wafer having only one type of memory cell is inspected, but the memory cell may repeat in a direction that is perpendicular to the direction of inspection. In some embodiments, the perpendicular repetition vector is the only repetition vector associated with the at least one region.

Embodiments of an electro-optical inspection system can be used to carry out embodiments of the inspection methods. For example, an inspection system can comprise a light source configured to illuminate a wafer, an imager configured to obtain an image of the wafer, and at least one processing unit. The processing unit can be configured to perform actions including obtaining an inspection image of at least a portion of the wafer including at least two regions, each region defined by different structural features having a different repetition vector from one another. The processing units are further configured to then access data that defines the repetition vector for each region and inspect each region using a cell-to-cell comparison method based on the region's repetition vector.

As was noted above, the repetition vectors can differ in any combination of repetition size and/or repetition direction. The processing unit can be configured to obtain a single image including the at least two regions. In some embodiments, the processing unit is configured to inspect each of the at least two regions in sequence. Embodiments of an electro-optical inspection system may include systems configured to obtain an inspection image of at least a portion of the wafer including a region defined by structural features having a repetition vector that is not parallel to the inspection path and inspecting the region using a cell-to-cell comparison method based on the region's repetition vector.

BRIEF DESCRIPTION OF THE DRAWINGS

A full and enabling disclosure, including the best mode of practicing the appended claims, directed to one of ordinary skill in the art, is set forth more particularly in the remainder of the specification, which makes reference to the appended figures, in which:

Use of like reference numerals in different features is intended to illustrate like or analogous components.

DETAILED DESCRIPTION

Figure 1A:
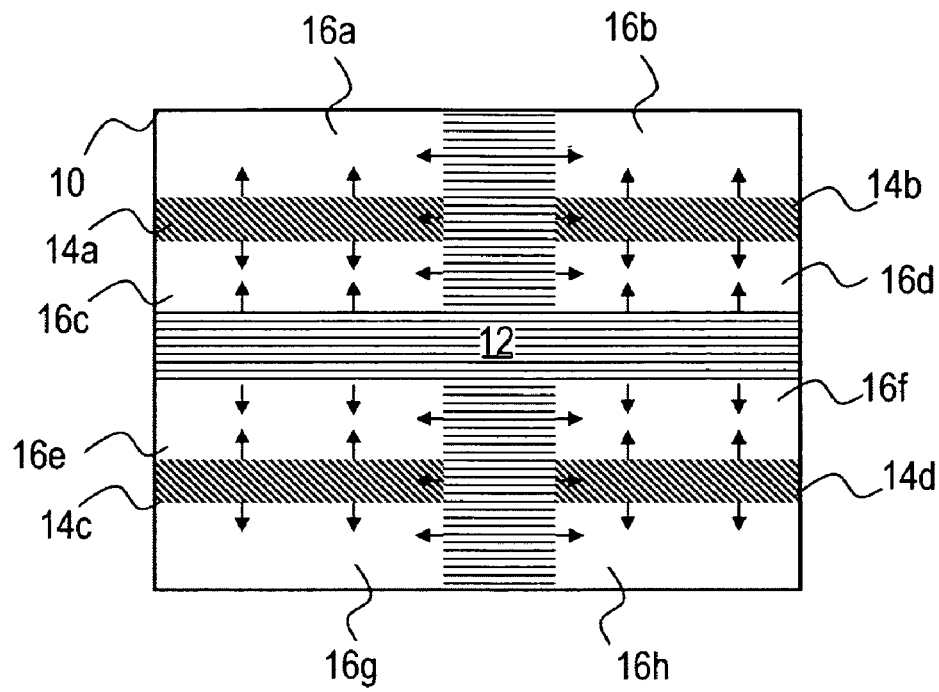
FIGS. 1A and 1B are diagrams illustrating exemplary region definitions in an inspection area.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the instant disclosure includes modifications and variations as come within the scope of the appended claims and their equivalents.

One of ordinary skill in the art will appreciate that embodiments of the methods described herein may be utilized with various types and arrangements of inspection tools and other types of tools. Generally speaking, an inspection tool can include one or more light sources such as a pulsed laser, another laser, and/or other suitable light source(s) that illuminate a wafer along with imaging optics and detection apparatus that allow one or more images of the wafer to be obtained. The various image processing steps and processes may be implemented using software, hardware, and combinations thereof. For example, certain steps may be implemented in programmable logic or other hardware in the inspection tool, with other steps implemented using software algorithms run by one or more computer systems included within the tool and/or associated with the tool (such as other systems connected via local or wide area connection(s)). The various computer systems are not limited to any particular hardware architecture or configuration. Any suitable programming, scripting, or other type of language or combinations of languages may be used to implement the teachings contained herein.

As an example, an inspection tool such as the Negevtech 3100 wafer inspection tool, available from Negevtech, Ltd., 12 Hamada St., Rehovot, Israel, may be configured to inspect wafers in accordance with the teachings contained herein using bright-field, dark-field, orthogonal dark field, or other inspection mode(s). Additionally, information may be found in exemplary Negevtech U.S. patent application Ser. No. 10/345,097, which is incorporated by reference herein for all purposes. However, any suitable tool may be configured to implement the present subject matter.

In embodiments of the present subject matter, images (both inspected and reference) are separated into regions. For example, as part of creating a recipe for inspection of a given wafer or layer of a wafer, various areas of the wafer may be designated by region type. For instance, the inspection tool may be used to create an image of an entire die, such as by combining images of multiple areas or imaging the die using low magnification. Additionally or alternatively, regions may be designated based on non-image data, such as wafer design specifications. Then, different areas of the wafer can be designated as masked, die-to-die regions, cell-to-cell regions, and bare regions by inputting data into the inspection tool, such as using a graphical interface or other interface(s). For instance, areas within a die may be designated for cell-to-cell inspection. Masked regions are not inspected, while bare regions are inspected without comparison to reference images, for example, by analyzing the regions to detect bright or dark pixels.

As part of the inspection process, the user may provide settings to fine-tune the inspection for different regions. For example, the user may tune the sensitivity of the inspection tool with regard to defect types, sizes, and other comparison parameters.

As part of the inspection recipe for cell-to-cell inspection, two additional parameters are needed, namely cell size and cell direction. The cell size parameter refers to the size of the repeating cell pattern, while the direction parameter refers to the direction in which the cell pattern repeats. Together, the cell size and cell direction parameters will be referred to as the repetition vector. A single repetition vector may have any size or direction, including horizontal, vertical, or any angle.

Additionally, some cell types may be described by multiple repetition vectors—for instance, a cell may repeat both horizontally and vertically and thus may have a horizontal and a vertical repetition vector. As another example, a square grid of cells repeats horizontally, vertically, and diagonally, and thus the cells may have horizontal, vertical, and diagonal repetition vectors. Depending on the cell arrangement, the multiple repetition vectors may have the same size or may have different repetition sizes from one another. For regions having multiple repetition vectors, the user may decide on a preferred repetition, or the particular vector that is used may be selected automatically. In some embodiments, a region comprising cells having multiple repetition vectors may be inspected using some or all of the multiple vectors.

The repetition vector(s) may be determined in any suitable manner. For example, in some embodiments, the repetition vector is manually input by one or more operators while specifying the inspection recipe. For example, the tool may provide the operator with one or more images of a cell-to-cell region and the user can determine the size and direction of one or more repetition vectors for cells in the region. The user may be provided with one or more software tools to aid in the process—for example, the inspection system may include overlays and other graphical manipulation tools whereby the user can measure pattern sizes. In other embodiments, the repetition vector may be defined wholly or partially automatically. For example, the inspection tool may analyze a cell-to-cell region and determine one or more repetition vectors that are then verified (or adjusted) by an operator. As another example, wafer specification data may set forth the size and pattern of dies and cells which can be analyzed to obtain one or more repetition vectors.

Once an image of a wafer is obtained by the inspection tool, it is separated into various regions according to the recipe. For instance, if the regions have been defined in die-coordinates (i.e. microns relative to the die corner), the region information is converted into image coordinates (pixels relative to the image corner) by determining where in the die the actual image lies. Similarly, if the repetition vector has been defined in microns (i.e. die-coordinates), its size and/or direction may be converted to pixel coordinates.

In some embodiments, additional pre-processing occurs before the actual inspection steps. For example, after regions have been designated, the actual boundaries of the region(s) may be widened, narrowed, or otherwise adjusted in order to avoid alarms caused by use of an inspection process for an area that should not be inspected using that process. For instance, the alarms may be false alarms, nuisance alarms, or even alarms cause by real defects, but for an area in which defects are not intended to be analyzed.

As an example, masked regions may be widened from the defined boundaries by a slight number of pixels in order to avoid false alarms. The widening may advantageously reduce inaccuracies due to region determination/masking, inaccuracies due to conversion from die to pixel coordinates (if applicable), and or inaccuracies due to pixel calibration. For instance, assume one or more noisy areas are to be masked for a high-sensitivity inspection run for inspecting other areas. If the defined boundaries do not include all of the noisy area that should be masked, the noisy area may induce false alarms and reduce the effectiveness of the inspection. For instance, the calculated or designated noisy area may not fit exactly to the requested masked area and may be, for example, offset by a few microns. Therefore, the masked area is expanded, in some embodiments up to 60 pixels. However, the actual number of pixels may vary in other embodiments, and the expansion could be by even more or by fewer pixels.

Similarly, inspection of an area using the wrong inspection type can lead to false alarms. For example, as discussed above, certain areas (such as peripheral areas) of a wafer are best inspected using die-to-die inspection, while other areas (such as memory areas) are best inspected by cell-to-cell inspection. If an area is not properly defined, false alarms may be introduced. Thus, the boundaries of inspection regions may be adjusted. For instance, a region designated for die-to-die inspection may be widened over adjacent cell-to-cell region(s). Although, for instance, this may result in inspection of a cell-to-cell region using die-to-die inspection, such an inspection is not problematic, since (in the ideal case) cells are also identical between identical dies. However, the reverse is not true, since a pattern in a die-to-die area is not necessarily repetitive within a die, and especially is unlikely to be repetitive at the scale of the cell repetition vector. Therefore, regions designated for cell-to-cell inspection may be narrowed by a slight number of pixels.

Figure 1B:
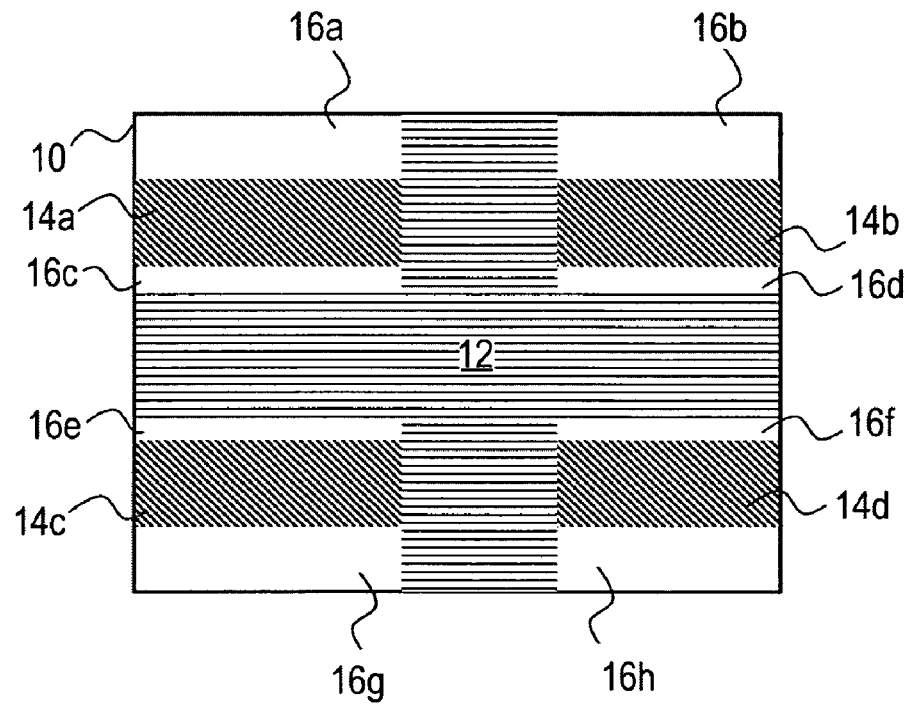

FIGS. 1A and 1B provide an example of the adjustment of region boundaries. In this example, region definitions 10 includes various areas generally designated 12, 14, and 16. Areas 12, 14, and 16 may represent, for instance, the areas initially designated in an inspection recipe. Although shown as rectangular regions in FIGS. 1A and 1B, any shape or combination of shapes may be used. For example, areas 14a, 14b, 14c, and 14d may represent areas designated for die-to-die inspection while area 12 represents a masked area. Areas 16a through 16h may represent other regions, such as portions of a die designated for comparison using cell-to-cell inspection, for instance. The arrows in FIG. 1A represent the direction in which boundaries are adjusted. As shown in FIG. 1B, areas 12, 14a, 14b, 14c, and 14d are widened over areas 16a through 16g. Furthermore, in this example, the widening of area 12 is widened over areas 14a, 14b, 14c, and 14d. The widening of areas 12 and 14 may therefore ensure that the masked and die-to-die regions, respectively, are treated as such.

The various designated regions may be inspected according to an inspection algorithm or algorithms configured to loop through each designated region type and inspect each non-masked region accordingly. The inspection may proceed in any order or sequence, and one or more regions may be inspected in parallel. For example, the algorithm may first inspect all blank areas in sequence to check for bright or dark areas. Next, the algorithm may inspect each die-to-die region in the wafer image. Finally, the algorithm may loop through each designated cell-to-cell region and inspect the region as set forth in more detail below.

The embodiments of cell-to-cell inspection discussed herein may play multiple roles in an inspection. For instance, the embodiments discussed herein may be used in conjunction with other data to confirm (or reject) the existence of a defect detected by one or more other inspection routines conducted beforehand or in parallel. Alternatively, the embodiments discussed herein may be used to identify defect candidates that are then confirmed (or rejected) as defects by one or more further inspection routines. Of course, in some circumstances, embodiments of cell-to-cell inspection may also comprise the only algorithm used for detection.

Figure 2:
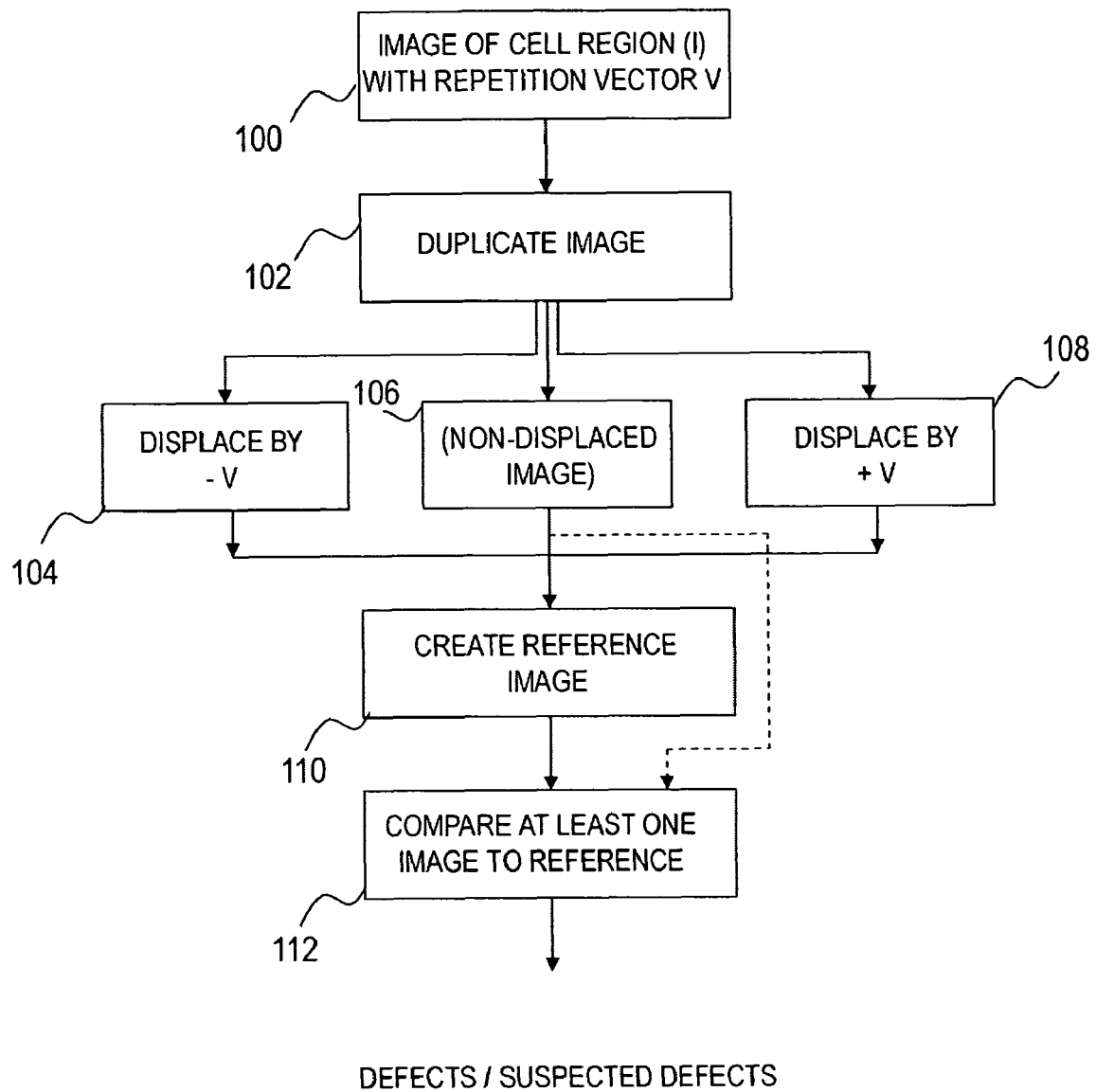
FIG. 2 is a flow diagram showing steps in an exemplary inspection method.

FIG. 2 is a flow diagram showing exemplary steps in a cell-to-cell inspection process for a region including a plurality of memory cells that repeat with a repetition vector V. As was noted above, repetition vector V includes data identifying the size of the repetition and the direction of repetition. At step 100, an image (I) of the cell region is obtained. For example, cell region I may be a portion of a wafer die image that is designated for cell-to-cell inspection. The cell region may be a portion of the cell area in the die or may be an image of the entire cell area, for instance. At step 102, the image is duplicated twice so that the inspection tool has three identical images of the region stored in memory. Although in this example two duplicates are used, in other embodiments one duplicate may be used, and in other embodiments more than two duplicates may be used. At steps 104 and 108, the image is displaced by the repetition vector V in opposite directions (referred to as −V and V in FIG. 1).

In some embodiments, the displacement is by an integer multiplication of V (and −V). In some cases, use of an integer multiplication of the vector terms may be preferable, such as if an integer multiplication of the repetition vector terms is closer to an integer number than the unmultiplied integer vector terms. As the component(s) of V approach integer numbers, the image displacement is more accurate and image sampling effects are less significant. Therefore, the inspection process can include selecting one or more integer multipliers to use in displacing the image.

For example, assume that a repetition vector V has an X-displacement of 4.3 pixels. Use of a repetition vector 3(V) may be preferable, since 3(V)=12.9 pixels, which is closer to an integer number (13) than the un-multiplied term (4.3) is to the nearest integer (4). On the other hand, an upper limit to integer multiplication is preferably observed—for instance 10(v)=43 pixels, but use of such a repetition vector may be too large in relative to the region size or may cause inaccuracies in the inspection. For instance, if there is a slight rotation in the image, then misalignment effects that are negligible for nearby cells become too large to ignore as the distance between the inspected cell and the reference cell(s) increases.

Displacement may occur at the pixel or sub-pixel resolution. In embodiments in which displacement is at sub-pixel resolutions, the sub-pixel correction may use any suitable technique, including bilinear interpolation, 1- or 2-dimensional same smear filtering, and/or other methods including nearest neighbor or bi-cubic interpolation. Examples including same-smear filtering are discussed in co-pending U.S. patent application Ser. No. 11/069,712, filed Feb. 28, 2005, which is hereby incorporated by reference for all purposes herein.

Step 106 indicates that, in this embodiment, there is at least one copy of the image that is not displaced. Some or all of steps 100, 102, 104, 106, and 108 may be combined and/or carried out in sequence or in parallel. For instance, in some embodiments, the inspection tool may include hardware that automatically creates three copies of the image at the time of imaging (one original and two more for displacement), with the additional steps performed by hardware and/or software in sequence.

In any event, in this embodiment, at step 110, a reference image is created from the original and displaced images. For example, the reference image may be obtained using a median operator on the original, V-displaced, and (−1)(V)-displaced images. However, the reference image may be created from any number of displaced images, and by using any suitable function or algorithm in addition to or instead of a median operator. For instance, in some embodiments, the reference image can comprise one of the displaced or non-displaced images.

At step 112, the non-displaced image is compared to the reference image using any suitable type or types of comparison. Although step 112 shows the non-displaced image being compared to the reference image, one or more of the displaced images may be compared to the reference image in addition to or instead of the non-displaced image in some embodiments. Any type(s) of comparison may be used. For instance, absolute difference comparison may be used to determine the extent of pixel differences between the original and reference image(s). In other embodiments, comparisons such as set forth in currently-pending U.S. patent application Ser. No. 11/069,712, filed Feb. 28, 2005 and assigned to Negevtech, Ltd., may be suitable.

In the above example, a copy of the original image was retained in non-displaced form. However, in other embodiments, all images may be displaced. For example, two copies of an inspection image may be obtained and then each image displaced in an opposite direction. For instance, the first copy may be displaced by V/2 and the second copy displaced by (−)V/2.

Figure 3:
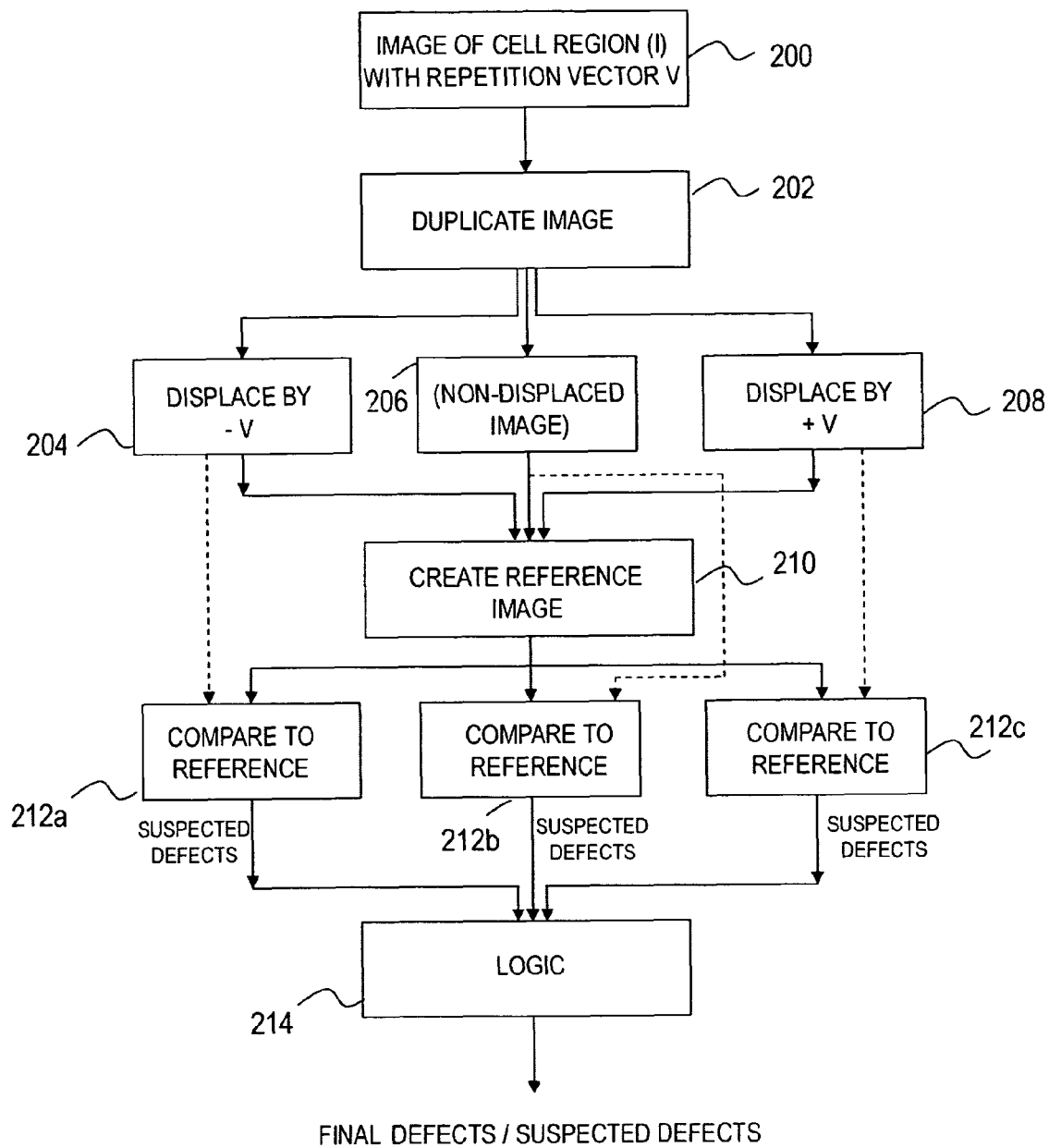
FIG. 3 is a flow diagram showing steps in a second exemplary inspection method.

FIG. 3 illustrates steps in another exemplary embodiment of cell-to-cell inspection. In FIG. 3, steps 200, 202, 204, 206, 208, and 210 are the same as steps 100, 102, 104, 106, 108, and 110 from the example of FIG. 2. Specifically, an image of a cell region is obtained, duplicated into three images, displaced by +V and −V, and a reference image is created. However, in the embodiment of FIG. 3, additional comparisons are preformed. The additional comparison steps may increase the probability of defect detection while reducing the rate of false alarms.

As shown in FIG. 3 at steps 212a, 212b, and 212c, each of the displaced images and the non-displaced images is compared to the reference image. Then, the comparison results for each image may be processed at step 214 by additional logic to determine the presence or absence of a defect. For instance, due to the displacement, certain defects may be missed by a comparison using only one or two of the images. In other circumstances, the displacement may cause the detection of a defect where there is none. Therefore, the additional logic may define one or more rules to finalize the defect determination. For instance, the logic may provide that a defect is only to be indicated if it is detected at the same point in two or more images. However, additional conditions and rules may be defined for specific areas of a region, cell types, and the like.

In some embodiments, the additional logic is used on the comparison data prior to the detection of one or more defects. For example, the additional logic may utilize the maximum of difference data from comparisons between each of the images and the reference images, which are then evaluated for determining whether a defect exists. For instance, comparison step 212a may result in a first difference image, comparison step 212b may result in a second difference image, and comparison step 212c may result in a third difference image. Then, a maximum difference image may be created, with each pixel in the maximum difference image comprising the pixel with the highest value selected from the first, second, and third images at the corresponding pixel address. Then, defects may be assessed based on evaluating the maximum difference image.

Figure 4:
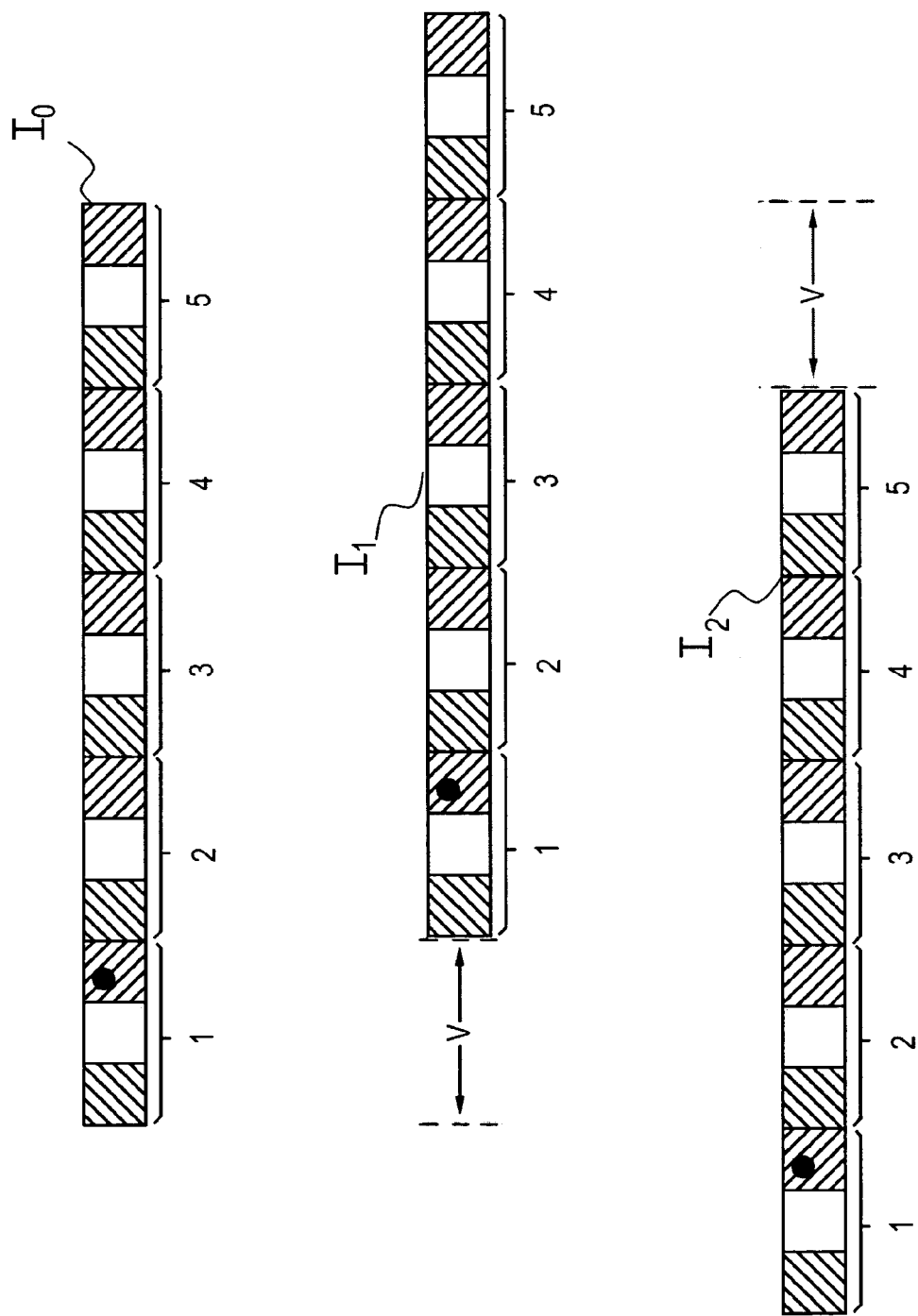
FIG. 4 is a diagram illustrating exemplary image displacements.

As was noted above, in some situations, comparison of the displaced images may advantageously improve inspection results in certain situations. FIG. 4 illustrates an example of one such situation. FIG. 4 is an illustration of an exemplary image $I_0$ comprising five cells (numbered 1-5), with each cell including three pixels. The repetition vector V for the cell type shown in FIG. 4 is also three pixels in the horizontal direction. Although the images shown in FIG. 4 are one-dimensional, it will be understood that the images are for purposes of example only. Embodiments of the cell-to-cell inspection process can be applied to entire images of regions, and not just strips as illustrated in FIG. 4. However, a 1-D strip is presented for purposes of illustration.

In this example, in cell number 1, a defect is indicated by the large black spot. FIG. 4 also includes image $I_1$, which shows $I_0$ having been displaced to the right by V and image $I_2$, which shows $I_0$ having been displaced to the left by V (or displaced by −V, if the rightward direction is defined as positive and leftward as negative). The cells in images 11 and 12 are labeled with their "original" cell numbers in FIG. 4.

The displaced images in FIG. 4 may be used to generate a median image, but the median image will only include three cells. This is because, in this example, cell number 5 has been clipped in $I_1$ and cell number 1 has been clipped in $I_2$. Thus, the three images only have the middle three cells in common for use in the median image—that is, the median image will have only a cell number 2, 3, and 4. Comparison of only $I_0$ to the median image will miss the defect in cell number 1 since the median image will include no corresponding cell for comparison. However, comparison of the right-displaced image $I_1$, (where cell number 2 corresponds to cell 1 of the original image), will indicate the presence of the defect at cell 2 of right-displaced image of $I_1$ (i.e. at original cell 1).

Step 214 shown in FIG. 3 may include rules for addressing edge defects such as illustrated in FIG. 4—for instance, for defects not at the edge of an image, two detections may be required, while defects at the edge of an image may only require detection in a single comparison. Additionally, the inspection logic can, of course, correlate defect detection or identification of a defect candidate to the correct cell—for instance, as noted above, a defect at cell 2 of image $I_1$ corresponds to a defect at cell 1 of the original image $I_0$.

Figure 5:
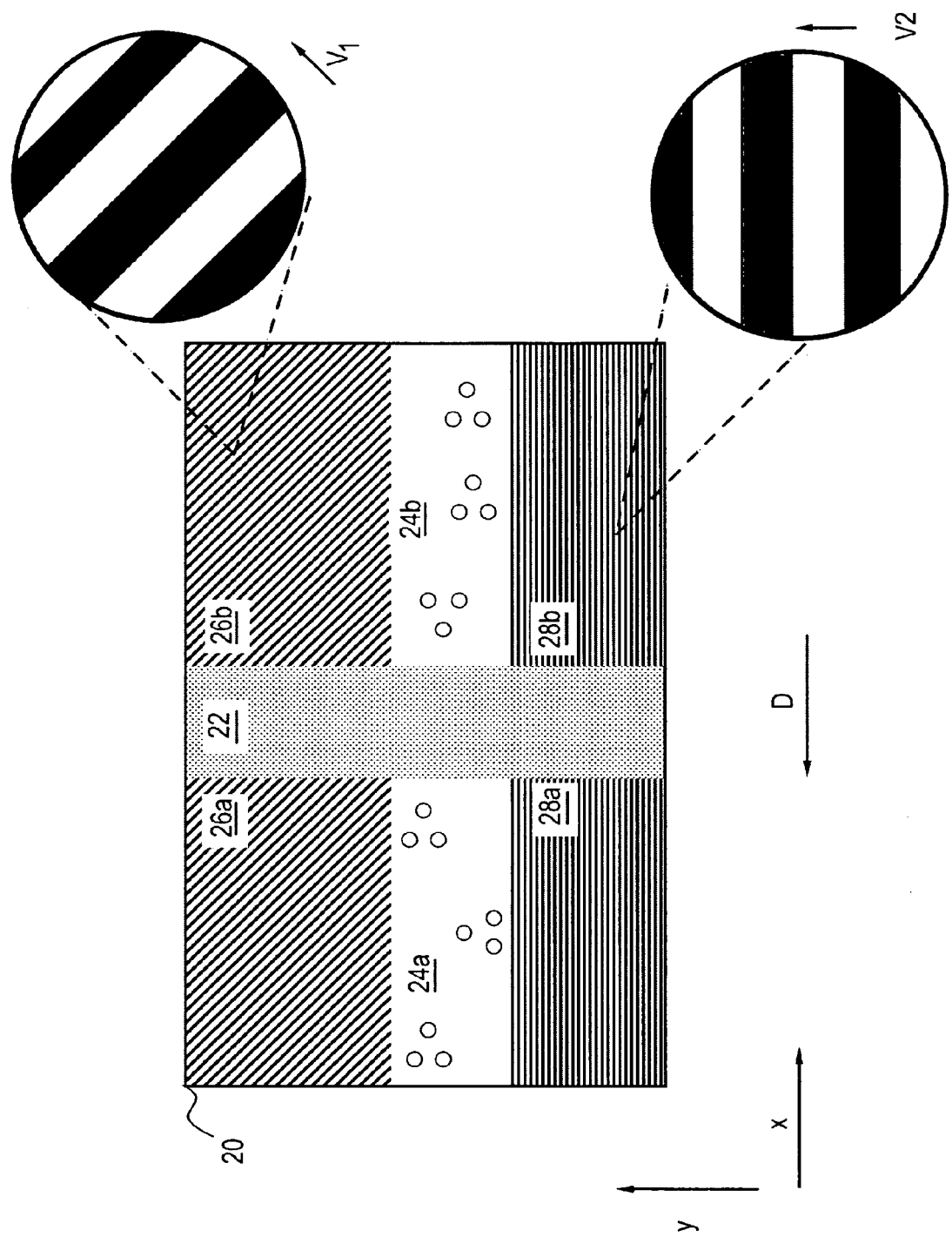
FIG. 5 is a diagram illustrating exemplary regions for inspection, including two different types of cell-to-cell regions.
Figure 6:
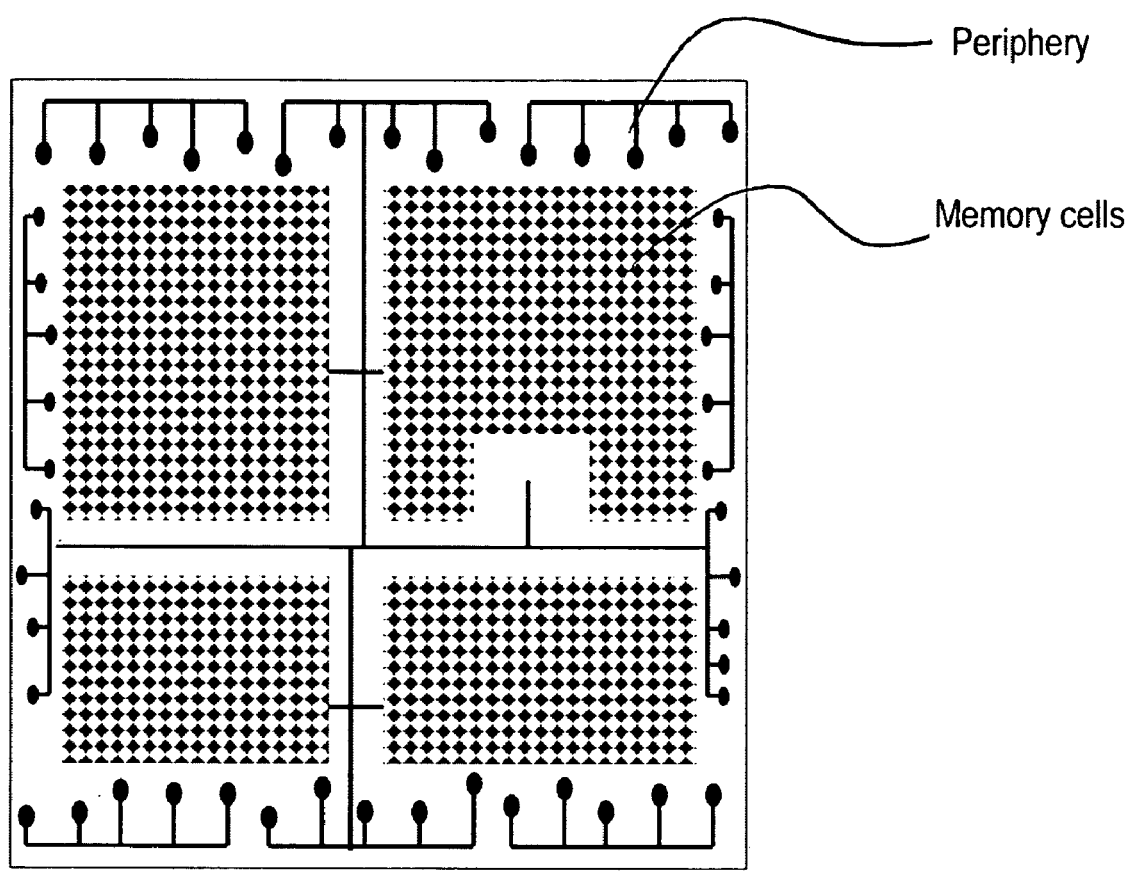
FIG. 6 is a diagram illustrating an exemplary component that may comprise one of a plurality of wafer dies.

FIG. 5 illustrates another exemplary image of an inspection area showing two different types of cells with different repetition vectors. Specifically, FIG. 5 shows an inspected area 20 which may, for example, comprise an image of a portion of a wafer. Four types of regions have been designated in portion 20: masked region 22, which is not to be inspected; die-to-die areas 24a and 24b, which are to be inspected by die-to-die comparison; cell-to-cell regions 26a and 26b, which are to be inspected using cell-to-cell comparison; and cell-to-cell regions 28a and 28b, which are also to be inspected using cell-to-cell comparison. For cell-to-cell regions 26 and 28, a magnified area is shown illustrating the respective repetition vectors for each region. The patterns shown in FIG. 5 are for purposes of illustration only. For example, the actual structural features of cell-to-cell areas may be more complex than is shown in FIG. 5.

An exemplary comparison will proceed as follows. For purposes of this example, assume that area 20 as shown in FIG. 5 has already been pre-processed, i.e., that the masked and die-to-die areas are already widened. During the inspection, area 22 is not compared at all. Die-to-die areas 24*a* and 24*b* are compared to identical die regions. For instance, area 24*a* may be compared to a corresponding area on an adjacent die, and then area 24*b* may be compared to a corresponding area on the adjacent die. However, the die or dies used for comparison do not need to be adjacent, of course. Alternatively, areas 24*a* and 24*b* may be compared to corresponding areas in a die reference image in the same step.

Next, cells within each of areas 26*a* and 26*b* are compared to one another using repetition vector V1. As noted by the enlarged area, in this example, each cell is displaced in the +x and +y directions for comparison to a reference cell. As noted above, the comparison may be based on an integer multiplier of V1, so the general terms x and y are used. The areas 26*a* and 26*b* may be processed as a single unit or sequentially. Finally, cells within each of areas 28*a* and 28*b* are inspected by comparing cells within each area using repetition vector V2. For cells within each of areas 28*a* and 28*b*, cell images are displaced in the +y direction for comparison to reference cells. Areas 28*a* and 28*b* may be processed in a single unit or sequentially. The cell-to-cell comparisons for areas 26 and for areas 28 may all be in serial or in parallel, depending on the capabilities of the inspection hardware, and the sequence discussed above is for example only.

FIG. 5 includes arrow D which illustrates that the direction of inspection in this example is in the (−x) direction. For instance, during inspection, the wafer may be moved by a stage and/or the imaging apparatus (or components thereof) may be repositioned/adjusted such that the wafer moves relative to the imaging apparatus in the (−x) direction. The presently-disclosed technology advantageously avoids drawbacks of prior cell-to-cell inspection methods that would have required special hardware or realignment of the wafer to inspect areas 26*a* and 26*b* and 28*a* and 28*b* in the same inspection run because the cells areas 26 and 28 do not repeat in identical directions. Additionally, the cells in areas 28 repeat in a direction that is perpendicular to the direction of inspection D. However, since an image or images of the region are obtained and then processed using imaging processing and inspection techniques disclosed herein, then the direction in which the wafer is imaged is not critical.

Although this example has discussed particular cell types, directions, and order of inspection of die-to-die and cell-to-cell regions, it is intended only for purposes of example. The various regions may be inspected in any suitable order and may be broken down into any suitable parts depending on the particular tools being used and wafer being inspected.

This disclosure has discussed examples of die-to-die and cell-to-cell comparison with regard to various reference images. The terms are not meant to be limited by the type or origin of the reference image. For instance, the term "die-to-die comparison" is meant to refer to comparison methods between all types of dies including, but not limited to: comparison methods in which a single die is compared to another single die, methods in which a single die or multiple dies are compared to other multiple dies, and comparison methods in which a single die or multiple dies are compared to a golden reference of a die.

Similarly, the term "cell-to-cell comparison" is meant to refer to comparison methods between all types of cells, including, but not limited to: comparison methods in which a single cell is compared to a single reference cell, methods in which a single cell or multiple cells are compared to multiple reference cells, and comparison methods in which a single cell or multiple cells are compared to a golden reference cell.

For example, in some embodiments, comparisons may be made to one or more generated reference images that comprise multiple images of a single or multiple cells (such as a golden cell or golden cell set) stitched together into a reference image. The generated reference image(s) may be used in addition to or instead of comparison to the displaced image(s). For instance, in some embodiments, a cell-to-cell inspection sequence can comprise comparing one or more non-displaced inspection images to one or more generated reference images. Additionally, in some embodiments, the generated reference image(s) may be used during the comparison to the displaced images. For example, the generated reference image(s) may be combined alongside the displaced images when preparing a reference image such as in step 110 and/or 210. Alternatively or additionally, in some embodiments, the displaced image(s) (or portions thereof) may be compared to one or more generated reference images.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. An electro-optical inspection method comprising:
imaging at least a portion of a semiconductor wafer, wherein (i) the wafer includes at least two regions, including a first region comprising a plurality of memory cells of a first type and a second region comprising a plurality of memory cells of a second type, and (ii) a repetition vector of at least one type of cells is different from a repetition vector of at least one other type of cells;
accessing data that defines at least one repetition vector for each type of cells; and
inspecting each region using a cell-to-cell comparison method based on data including the at least one repetition vector for the type of cells in each respective region.

2. The method as set forth in claim 1, wherein the inspecting includes, for at least one of the first and second regions:
generating at least one displaced image of the at least one region, including displacing an image of the at least one region by an integer multiple of the at least one repetition vector for the type of cells in the at least one region.

3. The method as set forth in claim 2, wherein the inspecting further includes, for at least one of the first and second regions:
comparing the at least one displaced image to a reference image of the at least one region; and
based on the comparison, identifying whether any defects or defect candidates have been detected in the at least one region.

4. The method asset forth in claim 2, wherein a plurality of displaced images are generated.

5. The method as set forth in claim 2, further comprising:
generating a reference image based on data including an image of the at least one region and the at least one displaced image.

6. The method as set forth in claim 1, wherein the repetition vectors differ in repetition size.

7. The method as set forth in claim 1, wherein the repetition vectors differ in repetition direction.

8. The method as set forth in claim 1, wherein the repetition vectors differ in both repetition direction and repetition size.

9. The method as set forth in claim 1, wherein the imaging includes generating a single image including the at least two regions.

10. The method as set forth in claim 1, wherein each of the at least two regions is inspected by a single processor in sequence.

11. The method as set forth in claim 1, further comprising generating a reference image for each type of memory cell.

12. An electro-optical inspection method comprising:
   imaging at least one portion of a semiconductor wafer along an inspection path, wherein the wafer includes at least one region comprising a plurality of memory cells having a repetition vector that is perpendicular to the inspection path and is an only repetition vector associated with the at least one region; and
   inspecting the at least one portion of the semiconductor wafer using a cell-to-cell comparison method.

13. An electro-optical inspection system, the system comprising:
   a light source configured to illuminate a wafer,
   an imager configured to image the wafer; and
   at least one processing unit configured to perform actions including: (i) obtaining an inspection image of at least a portion of the wafer including at least two regions, each region having a repetition vector different from one another, (ii) accessing data that defines the repetition vector for each region, and (iii) inspecting each region using a cell-to-cell comparison method based on the repetition vector of each region.

14. The system as set forth in claim 13, wherein the repetition vectors differ in repetition size.

15. The system as set forth in claim 13, wherein the repetition vectors differ in repetition direction.

16. The system as set forth in claim 13, wherein the repetition vectors differ in repetition size and repetition direction.

17. The system as set forth in claim 13, wherein the processing unit is configured to obtain a single image including the at least two regions.

18. The system as set forth in claim 17, wherein the processing unit is further configured to inspect each of the at least two regions in sequence.

19. An electro-optical inspection system, the system comprising:
   a light source configured to illuminate a wafer;
   an imager configured to image the wafer along an inspection path; and
   at least one processing unit; configured to perform actions including:
   (i) obtaining an inspection image of at least a portion of the wafer including a region defined by structural features having a repetition vector that is perpendicular to the inspection path and is an only repetition vector associated with the region, (ii) accessing data that defines the repetition vector, and (iii) inspecting the region using a cell-to-cell comparison method based on the repetition vector.

* * * * *